United States Patent
Gottam et al.

(10) Patent No.: US 12,531,944 B2
(45) Date of Patent: Jan. 20, 2026

(54) AUTOMATIC IMPLEMENTATION OF A SETTING FOR A FEATURE OF A DEVICE USING MACHINE LEARNING

(71) Applicant: QUALCOMM Incorporated, San Diego, CA (US)

(72) Inventors: Malathi Gottam, Guntur (IN); Rajeshwar Kurapaty, Hyderabad (IN); Vikash Garodia, Hyderabad (IN); Uma Mehta, Hyderabad (IN); Vishnu Priyanka Gujjula, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 429 days.

(21) Appl. No.: 17/816,843

(22) Filed: Aug. 2, 2022

(65) Prior Publication Data
US 2024/0048652 A1    Feb. 8, 2024

(51) Int. Cl.
*H04M 1/72454*    (2021.01)
(52) U.S. Cl.
CPC ............................. *H04M 1/72454* (2021.01)
(58) Field of Classification Search
CPC .......... H04M 1/72454; H04M 1/72457; G06N 20/00; G06N 20/10; G06N 20/20; G06N 3/09; G06N 3/084; G06N 3/088; G06F 3/01
USPC ....................................................... 455/456.1
See application file for complete search history.

(56) References Cited

U.S. PATENT DOCUMENTS

| | | | |
|---|---|---|---|
| 9,282,368 B2 * | 3/2016 | Adimatyam | H04N 21/44222 |
| 11,594,133 B2 * | 2/2023 | Kiley | G08G 1/096775 |
| 2006/0135139 A1 * | 6/2006 | Cheng | H04M 1/72454 |
| | | | 455/418 |
| 2019/0179317 A1 * | 6/2019 | England | G06N 3/045 |
| 2019/0180502 A1 * | 6/2019 | England | G01S 7/417 |
| 2019/0220697 A1 * | 7/2019 | Kiemele | G06T 7/75 |
| 2021/0214874 A1 | 7/2021 | Iancu et al. | |

(Continued)

FOREIGN PATENT DOCUMENTS

| | | |
|---|---|---|
| CN | 107835324 A | 3/2018 |
| JP | 2907057 B2 | 6/1999 |
| WO | WO2020247261 | * 12/2020 |

OTHER PUBLICATIONS

International Search Report and Written Opinion—PCT/US2023/023951—ISA/EPO—Sep. 8, 2023.

*Primary Examiner* — Jean A Gelin
(74) *Attorney, Agent, or Firm* — QUALCOMM Incorporated

(57) ABSTRACT

In some aspects, a device may obtain first sensor data from a sensor configured to detect a characteristic associated with the device. The device may cause automatic implementation of a first setting for a feature of the device that is controllable by a user, the first setting based at least in part on the first sensor data. The device may detect a user-controlled change to the first setting for the feature. The device may obtain second sensor data from the sensor. The device may cause automatic implementation of a second setting, for the feature, that is identified by a machine learning model based at least in part on the second sensor data. The machine learning model may be trained to identify a setting for the feature based at least in part on information relating to the user-controlled change to the first setting. Numerous other aspects are described.

20 Claims, 9 Drawing Sheets

(56) References Cited

U.S. PATENT DOCUMENTS

2023/0048398 A1* 2/2023 Mounier .................. G06F 3/011
2023/0132070 A1* 4/2023 Eggenberger ....... G06F 18/2163
  706/15
2024/0105034 A1* 3/2024 Kumar ................... G08B 7/062

* cited by examiner

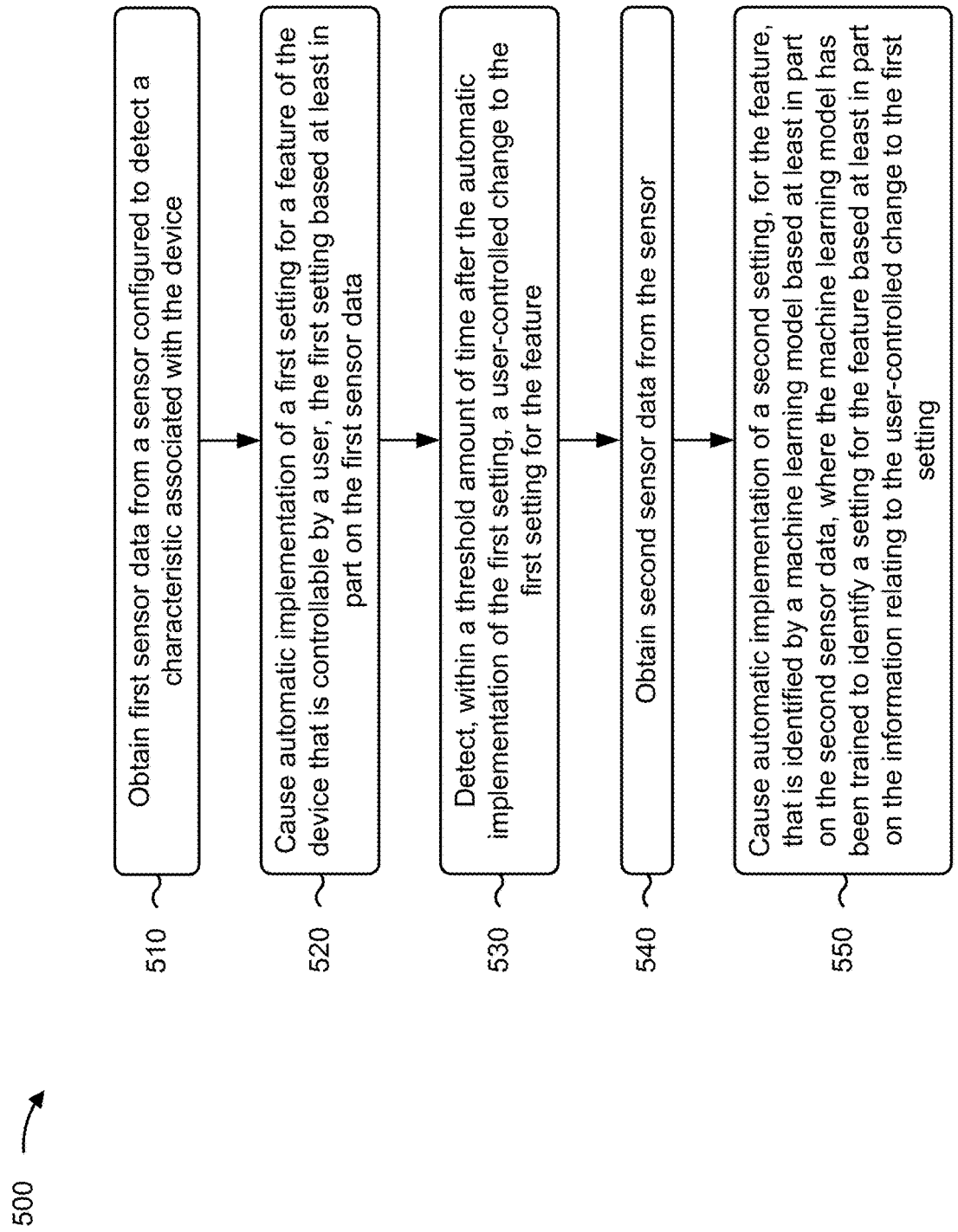

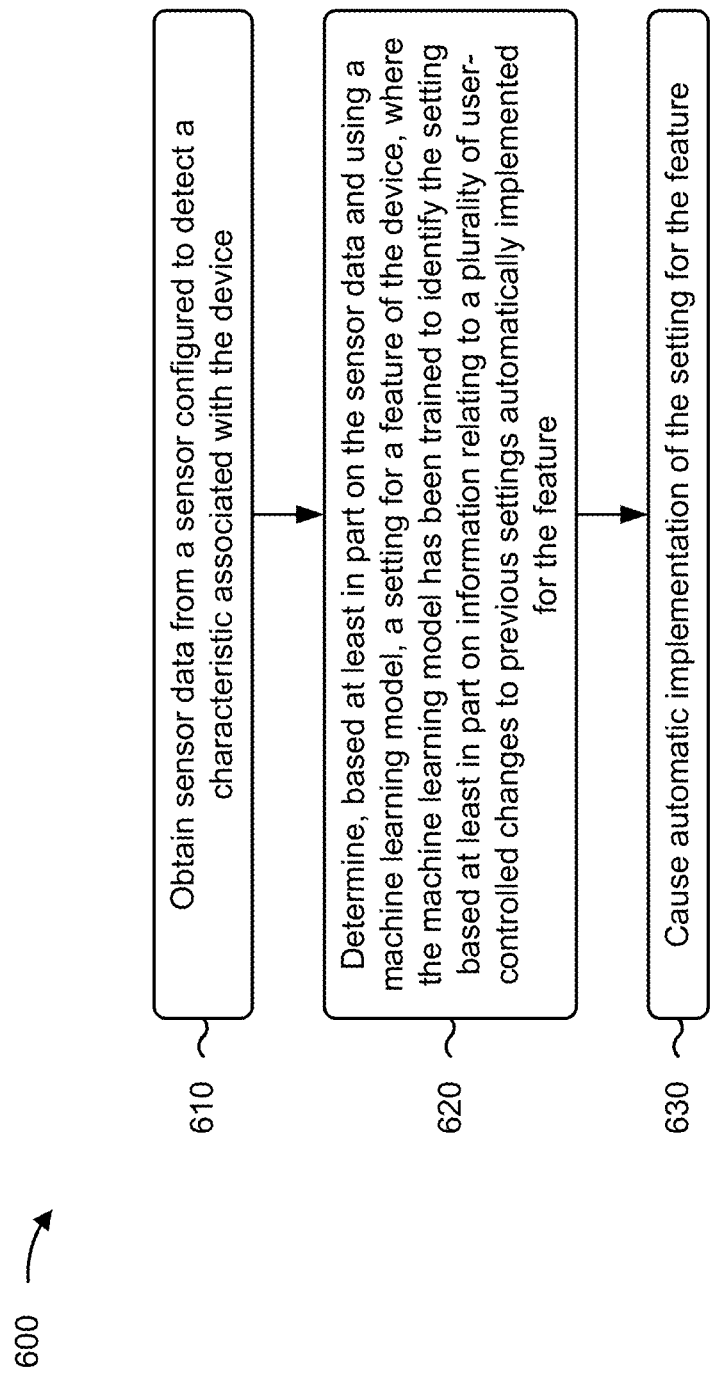

AUTOMATIC IMPLEMENTATION OF A SETTING FOR A FEATURE OF A DEVICE USING MACHINE LEARNING

FIELD OF THE DISCLOSURE

Aspects of the present disclosure generally relate to machine learning and, for example, to automatic implementation of a setting for a feature of a device using machine learning.

BACKGROUND

A user device (e.g., a smart phone) may automatically implement a setting for one or more features based on detecting a change in a characteristic associated with the user device (e.g., a characteristic relating to a physical environment of the user device or a characteristic relating to a condition of the user device). For example, based on detecting a change to a level of light in the physical environment of the user device, the user device may automatically adjust a setting for a brightness of a display of the user device.

SUMMARY

Some aspects described herein relate to a method. The method may include obtaining, by a device, first sensor data from a sensor configured to detect a characteristic associated with the device. The method may include causing, by the device, automatic implementation of a first setting for a feature of the device that is controllable by a user, the first setting based at least in part on the first sensor data. The method may include detecting, by the device and within a threshold amount of time after the automatic implementation of the first setting, a user-controlled change to the first setting for the feature. The method may include obtaining, by the device, second sensor data from the sensor. The method may include causing, by the device, automatic implementation of a second setting, for the feature, that is identified by a machine learning model based at least in part on the second sensor data. The machine learning model may be trained to identify a setting for the feature based at least in part on information relating to the user-controlled change to the first setting.

Some aspects described herein relate to a device. The device may include a memory and one or more processors coupled to the memory. The one or more processors may be configured to obtain first sensor data from a sensor configured to detect a characteristic associated with the device. The one or more processors may be configured to cause automatic implementation of a first setting for a feature of the device that is controllable by a user, the first setting based at least in part on the first sensor data. The one or more processors may be configured to detect, within a threshold amount of time after the automatic implementation of the first setting, a user-controlled change to the first setting for the feature. The one or more processors may be configured to obtain second sensor data from the sensor. The one or more processors may be configured to cause automatic implementation of a second setting, for the feature, that is identified by a machine learning model based at least in part on the second sensor data. The machine learning model may be trained to identify a setting for the feature based at least in part on information relating to the user-controlled change to the first setting.

Some aspects described herein relate to a non-transitory computer-readable medium that stores a set of instructions. The set of instructions, when executed by one or more processors of a device, may cause the device to obtain sensor data from a sensor configured to detect a characteristic associated with the device. The set of instructions, when executed by one or more processors of the device, may cause the device to determine, based at least in part on the sensor data and using a machine learning model, a setting for a feature of the device. The machine learning model may be trained to identify a setting for the feature based at least in part on information relating to a plurality of user-controlled changes to previous settings automatically implemented for the feature. The set of instructions, when executed by one or more processors of the device, may cause the device to cause automatic implementation of the setting for the feature.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a flowchart of an example process associated with automatic implementation of a setting for a feature of a user device using machine learning.

FIG. 6 is a flowchart of an example process associated with automatic implementation of a setting for a feature of a user device using machine learning.

DETAILED DESCRIPTION

Figure 1:
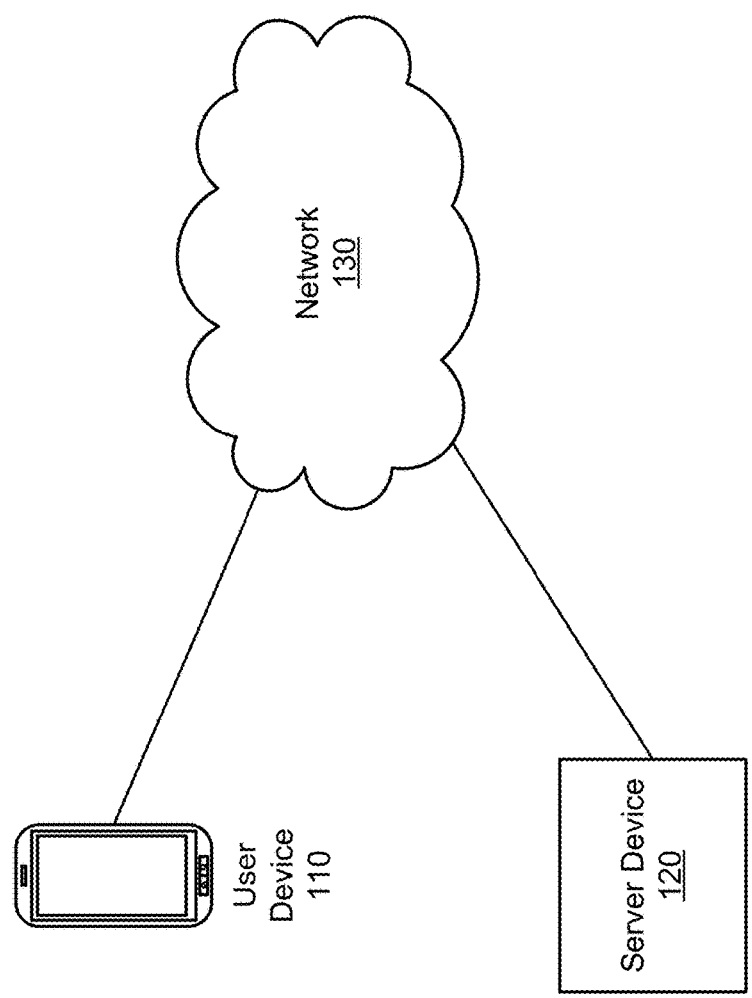
FIG. 1 is a diagram of an example environment in which systems and/or methods described herein may be implemented, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

A user device may be configured to enable a user to control various features of the user device, such as a brightness of a display of the user device, a rotation orientation of the display, a volume of a speaker of the user device, and/or a mode of a camera of the user device, among other examples. In some cases, the user device may automatically implement a setting for one or more features based on detecting a change in a characteristic associated with the user device (e.g., a characteristic relating to a physical environment of the user device or a characteristic relating to a condition of the user device). For example, based on detecting a change to a level of light in the physical environment of the user device, the user device may automatically adjust a setting for the brightness of the display of the user device. As another example, based on detecting a change in an orientation of the user device (e.g., from a vertical orientation to a horizontal orientation), the user device may automatically adjust a setting for a rotation orientation of the display of the user device (e.g., from a portrait mode to a landscape mode).

Sometimes, the user may be dissatisfied with the adjustment to the setting that is performed automatically by the user device. For example, a sensor of the user device may mischaracterize a level of light in the physical environment of the user device if the user device is positioned relative to a light source such that the user device blocks light from reaching the sensor, and the user device may erroneously reduce the brightness of the display. In such cases, the user may override the automatic setting to a desired value using controls of the user device (e.g., mechanical controls or controls accessible in a user interface presented on the user device). Accordingly, the user device may expend significant computing resources (e.g., processor resources, memory resources, or the like) in connection with determining an erroneous setting and automatically implementing the erroneous setting as well as in connection with the user overriding the erroneous setting.

Some techniques and apparatuses described herein use machine learning to identify a setting for a feature of a device. For example, a machine learning model may be trained to identify the setting for the feature based at least in part on sensor data obtained by the device. In some aspects, the machine learning model may be trained to identify the setting for the feature using information relating to previous user-controlled changes to previous automatically-implemented settings for the feature. In this way, the device may identify, and automatically implement, a setting for the feature that has improved accuracy, and therefore a likelihood that the user will override the setting is reduced. Accordingly, techniques and apparatuses described herein conserve computing resources that would otherwise be expended when an erroneous setting is automatically implemented for the feature.

FIG. 1 is a diagram of an example environment 100 in which systems and/or methods described herein may be implemented, in accordance with the present disclosure. As shown in FIG. 1, environment 100 may include a user device 110, a server device 120, and a network 130. Devices of environment 100 may interconnect via wired connections, wireless connections, or a combination of wired and wireless connections.

The user device 110 includes one or more devices capable of receiving, generating, storing, processing, and/or providing information associated with automatic implementation of a setting for a feature, as described elsewhere herein. The user device 110 may include a communication device and/or a computing device. For example, the user device 110 may include a wireless communication device, a mobile phone, a user equipment (UE), a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The server device 120 includes one or more devices capable of receiving, generating, storing, processing, providing, and/or routing information associated with automatic implementation of a setting for a feature, as described elsewhere herein. The server device 120 may include a communication device and/or a computing device. For example, the server device 120 may include a server, such as an application server, a client server, a web server, a database server, a host server, a proxy server, a virtual server (e.g., executing on computing hardware), or a server in a cloud computing system. In some aspects, the server device 120 includes computing hardware used in a cloud computing environment.

The network 130 includes one or more wired and/or wireless networks. For example, the network 130 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 130 enables communication among the devices of environment 100.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
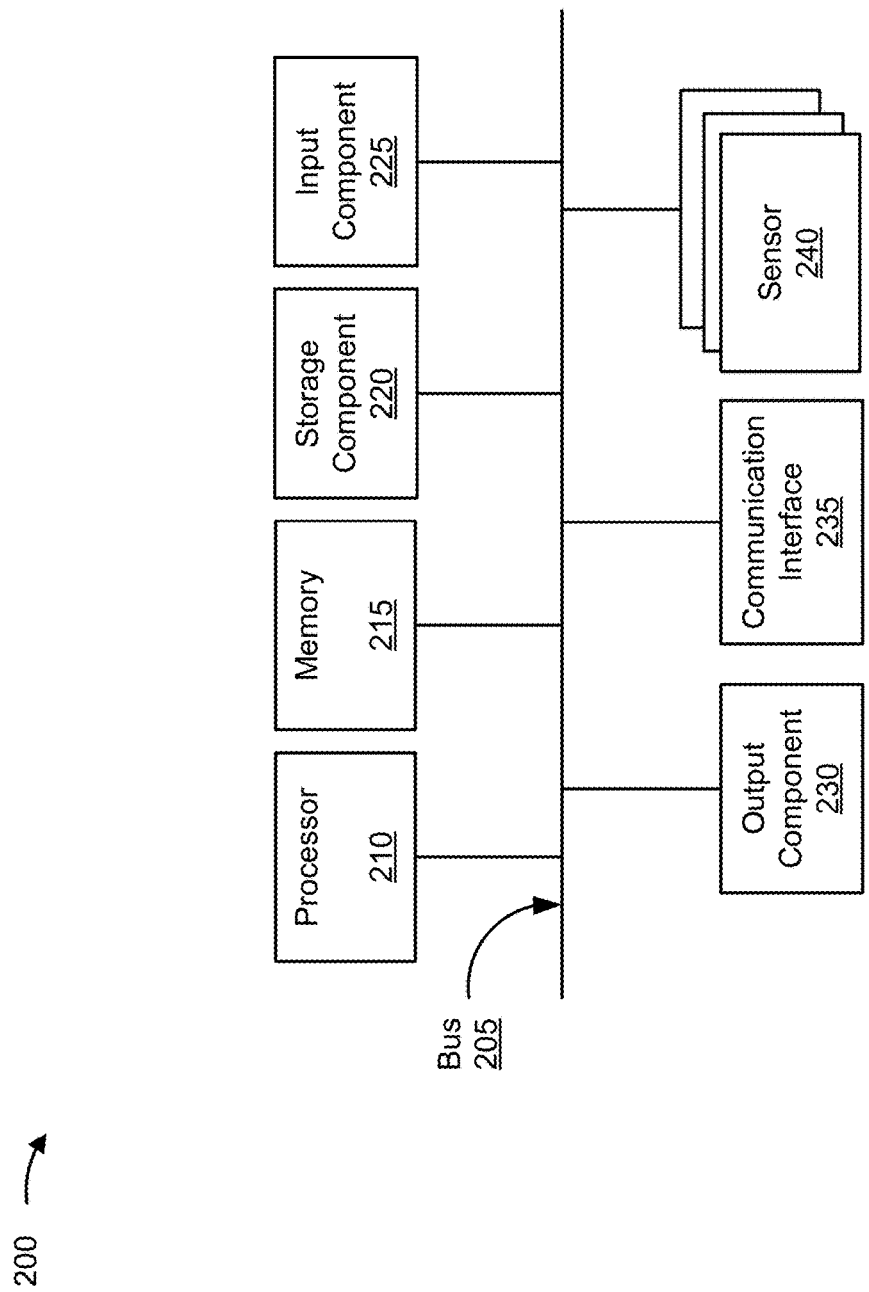
FIG. 2 is a diagram illustrating example components of a device, in accordance with the present disclosure.

FIG. 2 is a diagram illustrating example components of a device 200, in accordance with the present disclosure. Device 200 may correspond to user device 110 and/or server device 120. In some aspects, user device 110 and/or server device 120 may include one or more devices 200 and/or one or more components of device 200. As shown in FIG. 2, device 200 may include a bus 205, a processor 210, a memory 215, a storage component 220, an input component 225, an output component 230, a communication interface 235, and/or one or more sensors 240 (referred to individually as a "sensor 240" and collectively as "sensors 240").

Bus 205 includes a component that permits communication among the components of device 200. Processor 210 is implemented in hardware, firmware, or a combination of hardware and software. Processor 210 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 includes one or more processors capable of being programmed to perform a function. Memory 215 includes a random access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component or a global navigation satellite system (GNSS) component) and/or a sensor for sensing information (e.g., an accelerometer, a gyroscope, an actuator, or another type of position or environment sensor). Output component 230 includes a component that provides output information from device 200 (e.g., a display, a speaker, a haptic feedback component, and/or an audio or visual indicator).

Communication interface 235 includes a transceiver-like component (e.g., a transceiver and/or a separate receiver and transmitter) that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency interface, a universal serial bus (USB) interface, a wireless local area interface (e.g., a Wi-Fi interface), and/or a cellular network interface.

Sensor 240 includes one or more devices capable of detecting a characteristic associated with device 200 (e.g., a characteristic relating to a physical environment of the device 200 or a characteristic relating to a condition of the device 200). Sensor 240 may include one or more photodetectors (e.g., one or more photodiodes), one or more cameras, one or more microphones, one or more gyroscopes (e.g., a micro-electro-mechanical system (MEMS) gyroscope), one or more magnetometers, one or more accelerometers, one or more location sensors (e.g., a global positioning system (GPS) receiver or a local position system (LPS) device), one or more motion sensors, one or more temperature sensors, and/or one or more pressure sensors, among other examples.

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 200 includes means for performing one or more processes described herein and/or means for performing one or more operations of the processes described herein. In some aspects, device 200 may include means for obtaining first sensor data from a sensor configured to detect a characteristic associated with the device; means for causing automatic implementation of a first setting for a feature of the device that is controllable by a user, the first setting based at least in part on the first sensor data; means for detecting, within a threshold amount of time after the automatic implementation of the first setting, a user-controlled change to the first setting for the feature; means for obtaining second sensor data from the sensor; means for causing automatic implementation of a second setting, for the feature, that is identified by a machine learning model based at least in part on the second sensor data; or the like. In some aspects, device 200 may include means for obtaining first sensor data from a sensor configured to detect a characteristic associated with the device; means for causing automatic implementation of a first setting for a feature of the device that is controllable by a user, the first setting based at least in part on the first sensor data; means for detecting, within a threshold amount of time after the automatic implementation of the first setting, a user-controlled change to the first setting for the feature; means for obtaining second sensor data from the sensor; means for causing automatic implementation of a second setting, for the feature, that is identified by a machine learning model based at least in part on the second sensor data; or the like. In some aspects, device 200 may include means for obtaining sensor data from a sensor configured to detect a characteristic associated with the device; means for determining, based at least in part on the sensor data and using a machine learning model, a setting for a feature of the device; means for causing automatic implementation of the setting for the features; or the like. In some aspects, such means may include one or more components of device 200 described in connection with FIG. 2, such as bus 205, processor 210, memory 215, storage component 220, input component 225, output component 230, communication interface 235, and/or sensor 240.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

FIGS. 3A-3D are diagrams illustrating an example 300 associated with automatic implementation of a setting for a feature of a user device using machine learning, in accordance with the present disclosure. As shown in FIGS. 3A-3D, example 300 includes a user device 110, as described in connection with FIGS. 1-2. The user device 110 may be configured with one or more features that are controllable by a user of the user device 110. For example, the user may control settings for the one or more features using mechanical controls of the user device 110 (e.g., buttons or switches, among other examples), in a user interface (e.g., a graphical user interface) presented on the user device 110 (e.g., a settings menu), and/or by performing a particular movement of the user device 110 (e.g., shaking the user device) or a particular touch gesture on the user device 110. Moreover, settings for the one or more features may be automatically implemented by the user device 110. "Automatic implementation" may refer to the user device 110 adjusting a setting for a feature in the absence of (e.g., independent of) control by the user (e.g., an input or a command to the user device 110 to adjust the setting for the feature).

A feature may relate to a user interface presented on the user device 110, may provide user assistance, and/or may relate to usability of the user device 110, among other examples. In some aspects, a feature may include a brightness of a display of the user device 110, and a corresponding setting may indicate a level of the brightness. Additionally, or alternatively, a feature may include a rotation orientation of the display, and a corresponding setting may indicate a portrait orientation or a landscape orientation. Additionally, or alternatively, a feature may include a volume of a speaker of the user device 110, and a corresponding setting may indicate a level of the volume. Additionally, or alternatively, a feature may include a mode for a camera of the user device 110 (e.g., a night mode, an auto-focus mode, or a flash mode, among other examples), and a corresponding setting may indicate activation or deactivation of the mode and/or a level for the mode. The foregoing examples of features are not exhaustive, and the description herein is applicable to other features of a user device 110. Moreover, while the following description is described in terms of a single feature, the techniques described herein may be used for multiple features (e.g., concurrently).

Figure 3A:
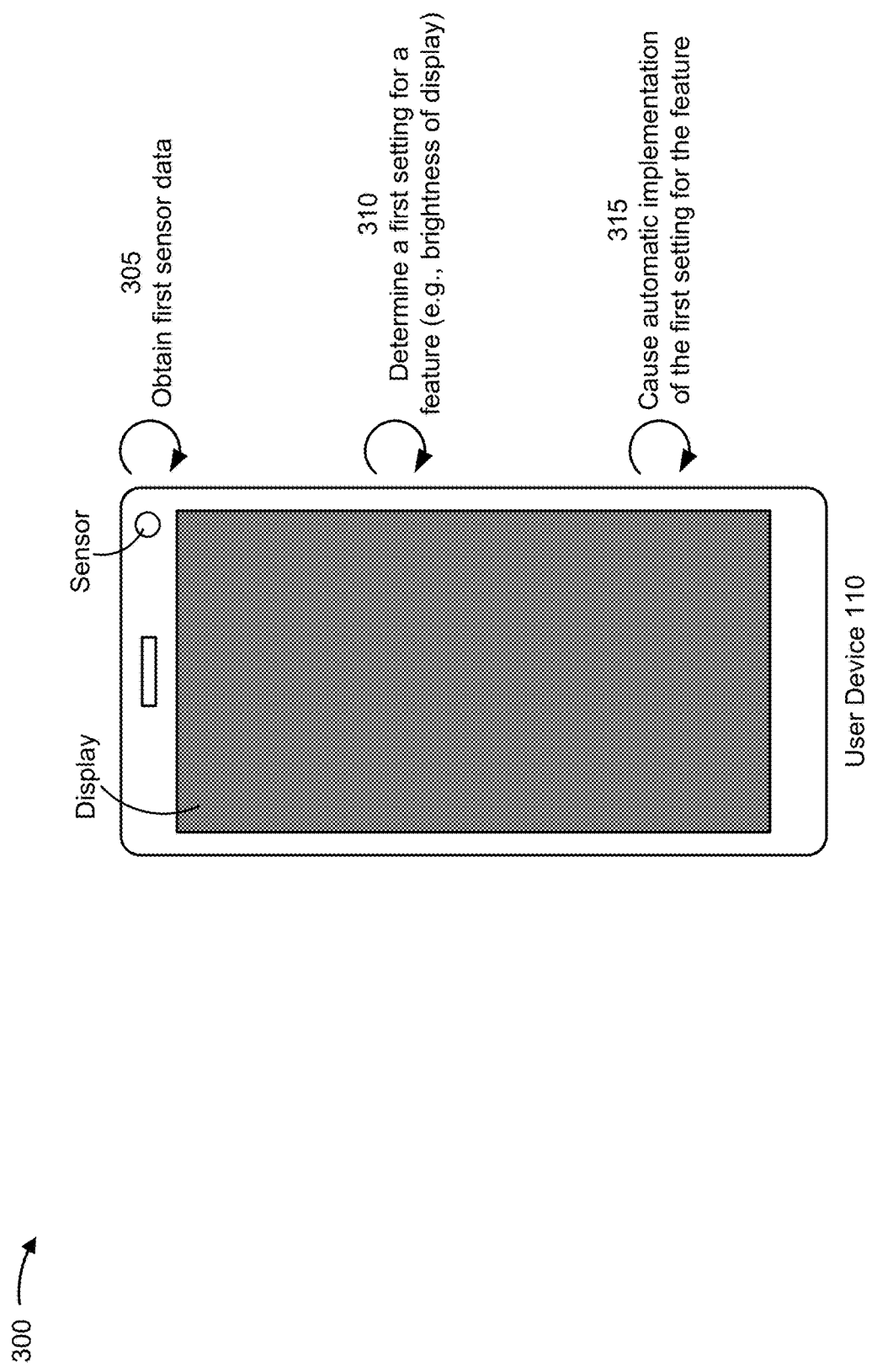
FIGS. 3A-3D are diagrams illustrating an example associated with automatic implementation of a setting for a feature of a user device using machine learning, in accordance with the present disclosure.
Figure 3B:
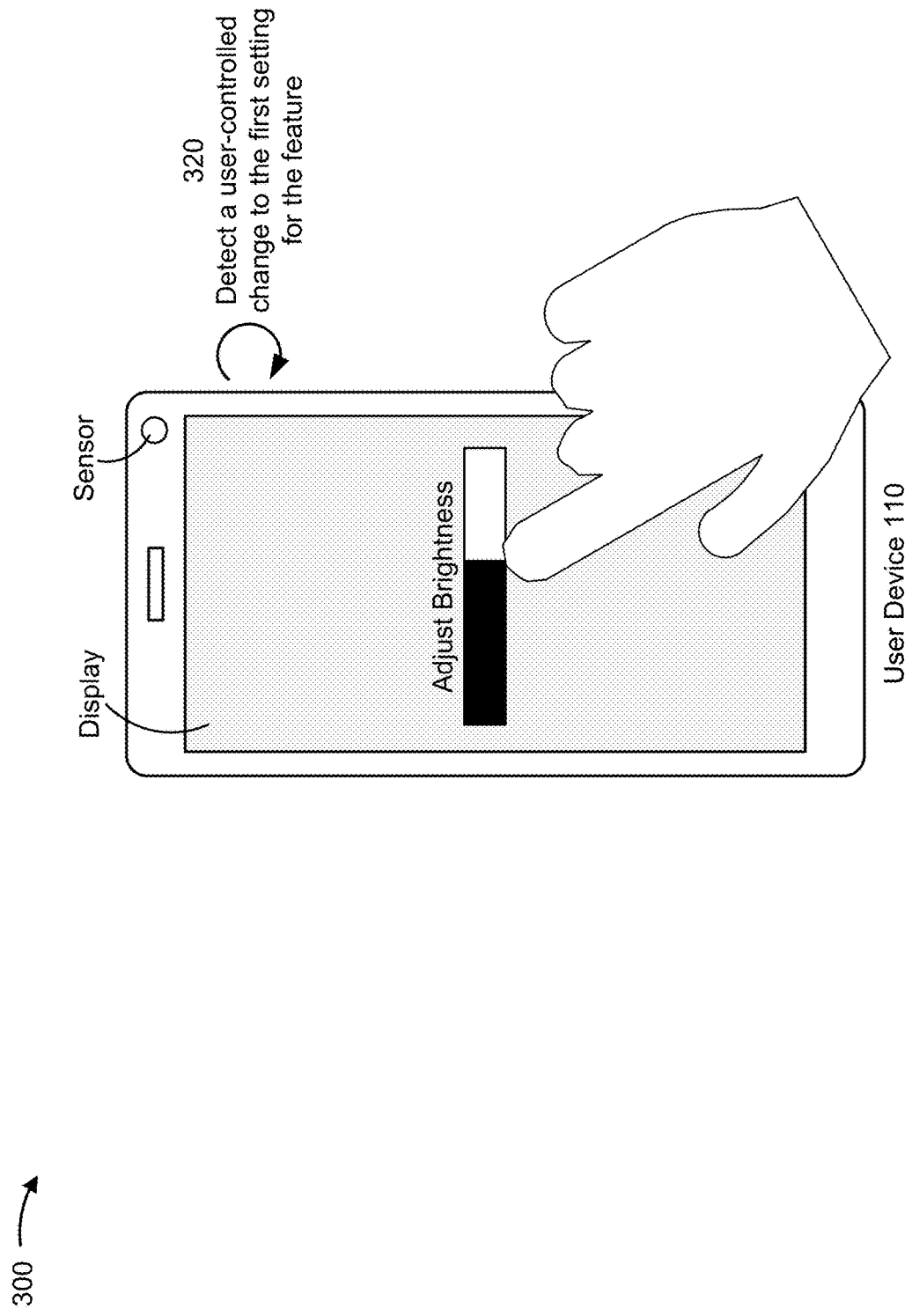

In some aspects, user-controlled changes to settings for a feature of the user device 110 may be monitored and used for training a machine learning model, as described herein. As shown in FIG. 3A, and by reference number 305, the user device 110 may obtain first sensor data from a sensor (e.g., a sensor 240) configured to detect a characteristic associated with the user device 110. For example, the characteristic may be of a physical environment of the user device 110, such as a temperature, a light level, and/or a sound level. Additionally, or alternatively, the characteristic may be of a condition (e.g., a position) of the user device 110, such as a rotation of the user device 110 and/or an orientation of the user device 110. The first sensor data may indicate a change to the characteristic (e.g., from previous sensor data or from another type of baseline).

As shown by reference number 310, the user device 110 may determine a first setting for a feature of the user device 110 based at least in part on the first sensor data (e.g., the first setting is based at least in part on the first sensor data). For example, if the sensor data indicates a level of light in the physical environment of the user device 110, then the user device 110 may determine a setting for a brightness of the display of the user device 110. The user device 110 may determine the first setting for the feature responsive to the first sensor data indicating the change to the characteristic (e.g., if the characteristic changed by a threshold amount). In some aspects, the user device 110 may determine the first setting for the feature using the machine learning model (e.g., an earlier-trained version of the machine learning model).

As shown by reference number 315, the user device 110 may cause automatic implementation of the first setting for the feature. That is, the user device 110 may cause adjustment of a setting for the feature to the first setting without (e.g., independent of) a user input indicating that the setting should be adjusted to the first setting. The user device 110 may cause automatic implementation of the first setting for the feature responsive to the first sensor data indicating the change to the characteristic (e.g., if the characteristic changed by a threshold amount). As described herein, the first setting for the feature may be erroneous, in that the first setting is unnecessary or unwanted by the user. Accordingly, the user may command (e.g., immediately) a change to the setting. For example, if the automatic implementation of the first setting results in a reduction of a brightness of the display of the user device 110, then the user may override the first setting and increase the brightness.

As shown in FIG. 1B, and by reference number 320, the user device 110 may detect a user-controlled change to the first setting for the feature. That is, the user device 110 may detect an adjustment to a setting for the feature, from the first setting, that is performed by the user (e.g., the adjustment is not one that is automatically implemented by the user device 110). In some aspects, the user device 110 may detect the user-controlled change within a threshold amount of time (e.g., 3 seconds, 5 seconds, or 10 seconds) after the automatic implementation of the first setting. In some aspects, if the user-controlled change is detected beyond the threshold amount of time, then the user device 110 may ignore the user-controlled change (e.g., for purposes of training the machine learning model).

Figure 3C:
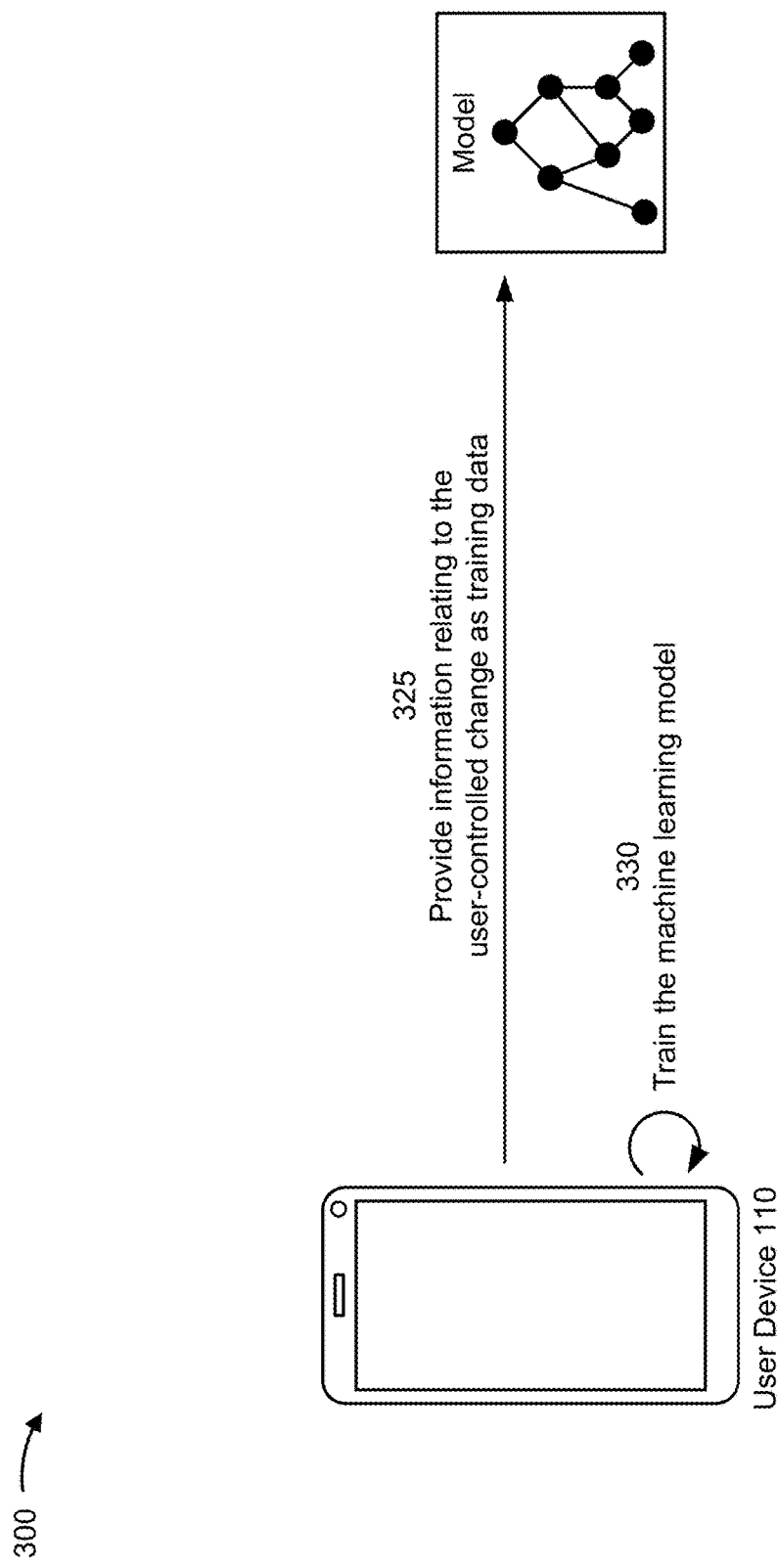

As shown in FIG. 3C, and by reference number 325, the user device 110 may provide information relating to the user-controlled change to the first setting as training data for the machine learning model. In some aspects, the user device 110 may provide the information along with an indication of the feature of the user device 110 to which the information pertains and/or an indication of a type of sensor that collected the first sensor data. In some aspects, the machine learning model may reside locally at the user device 110 and providing the information may include outputting the information. In some aspects, the machine learning model may reside remotely from the user device 110 (e.g., at the server device 120) and providing the information may include transmitting the information (e.g., to the server device 120).

The information relating to the user-controlled change may indicate the first sensor data (e.g., an amount of a change in the sensor data that caused automatic implementation of the first setting or a value associated with the change in the sensor data that caused automatic implementation of the first setting), a value of the user-controlled change to the first setting (e.g., the user-controlled change may have set a brightness of the display of the user device 110 to a value of 90%), a time at which the first sensor data was collected (e.g., a timestamp), and/or a location (e.g., geographic coordinates) of the user device 110 at the time at which the first sensor data was collected. The time and/or the location may indicate preferences of the user with respect to a setting for the feature. For example, the user may prefer a brighter display at particular times of day (e.g., morning) or at particular locations (e.g., at an office) and a dimmer display at other times of day (e.g., night) or at other locations (e.g., at home).

As shown by reference number 330, the user device 110 may train the machine learning model to identify a setting for the feature based at least in part on the information relating to the user-controlled change to the first setting. The training may be an initial training of the machine learning model or a re-training of the machine learning model (e.g., in connection with continuous training of the machine learning model). In some aspects, the server device 120 may train the machine learning model to identify a setting for the feature, and provide the trained machine learning model to the user device 110.

In some aspects, the machine learning model may be trained using the information relating to the user-controlled change to the first setting and in accordance with a training procedure. In some aspects, the training procedure may include performing a forward propagation ("forward propagation" or "forward computation" may refer to a computation that is performed from an input layer, through one or more hidden layers, to an output layer of a machine learning model to generate an output of the machine learning model) using the machine learning model (e.g., using the first sensor data as an input to the machine learning model), and applying a loss function to a result of the forward computation to identify a degree by which an output of the machine learning model deviates from an actual result (e.g., the user-controlled change to the first setting). Moreover, the training procedure may include a back-propagation of the machine learning model using a result of the loss function to determine adjustments to weights used by the machine learning model ("back-propagation" may include traversing a machine learning model backwards, from an output layer through one or more hidden layers, using an algorithm for tuning weights of the machine learning model). The machine learning model may be updated using the adjustments to the weights.

While the training procedure is described above using information relating to a single user-controlled change to the first setting, in practice, information relating to one or more user-controlled changes to settings for the feature may be used as training data for the machine learning model. For example, the machine learning model may be trained to identify a setting for the feature based at least in part on information relating to a plurality of user-controlled changes to settings for the feature, and the plurality of user-controlled changes may be from settings that are automatically implemented for the feature (e.g., by the user device 110).

In other words, the information relating to the plurality of user-controlled changes to settings for the feature may be a set of observations for training the machine learning model (e.g., each instance of a user-controlled change to an automatically-implemented setting may be an observation for training the machine learning model). The set of observations may include a feature set, and the feature set may include a set of variables. Thus, a specific observation may include a set of variable values (or feature values) corresponding to the set of variables. The feature set may be extracted from structured data and/or based on an input from an operator. As an example, a feature set for the set of observations may include an amount of a change in sensor data, a value associated with the change in sensor data, a time at which the sensor data is collected, and/or a location of the user device 110 at the time the sensor data is collected. The set of observations may be associated with a target variable, which may represent a variable having a numeric value, a variable having a numeric value that falls within a range of values or has some discrete possible values, a variable that is selectable from one of multiple options, and/or a variable having a Boolean value. For the set of observations, the target variable may be a value for a setting of the feature of the user device 110. For example, the target variable for each observation in the training data may be the user-controlled change to the automatically-implemented setting for the observation.

Thus, the target variable may represent a value that the machine learning model is being trained to predict, and the feature set may represent the variables that are input to the machine learning model to predict a value for the target variable. The machine learning model may be trained to recognize patterns in the feature set that lead to a target variable value (e.g., the machine learning model may be a supervised learning model). The machine learning model may be trained using the set of observations and using one or more machine learning algorithms, such as a regression algorithm, a decision tree algorithm, a neural network algorithm, a k-nearest neighbor algorithm, a support vector machine algorithm, or the like.

Once the machine learning model is trained (or re-trained), the user device 110 may use the machine learning model to identify a setting for the feature. That is, the machine learning model may output information that identifies a value for the target variable for a new observation. Additionally, or alternatively, the output may include information that identifies a cluster to which the new observation belongs and/or information that indicates a degree of similarity between the new observation and one or more other observations (e.g., such as when unsupervised learning is employed).

In some aspects, a respective machine learning model may be trained and utilized for multiple features of the user device 110. For example, the user device 110 may train and/or use a first machine learning model to identify a setting for a first feature of the user device 110 (e.g., a brightness of the display of the user device 110), a second machine learning model to identify a setting for a second feature of the user device 110 (e.g., a rotation orientation of the display of the user device 110), and so forth. In some aspects, a machine learning model used by the user device 110 may be a regression model (e.g., for identifying a setting for a brightness of the display). In some aspects, a machine learning model used by the user device 110 may be a classifier model (e.g., for identifying a setting for a rotation orientation of the display). Other types of machine learning models may also be used by the user device 110.

Figure 3D:
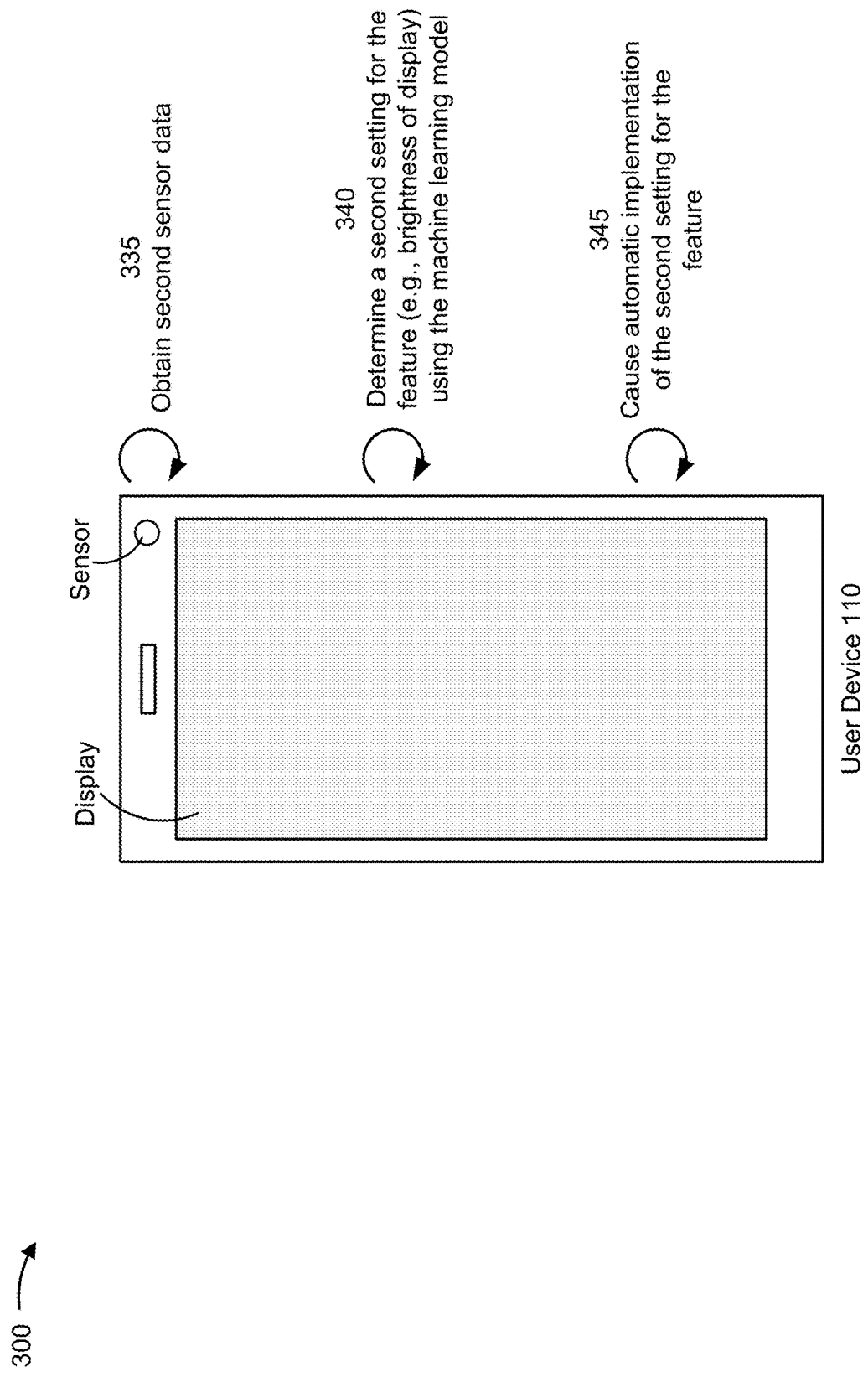

As shown in FIG. 3D, and by reference number 335, the user device 110 may obtain second sensor data from the sensor, in a similar manner as described above. For example, the second sensor data may indicate a change to the characteristic (e.g., from previous sensor data or from another baseline) associated with the user device 110 that the sensor is configured to detect. In some aspects, the user device 110 may identify a type of the second sensor data. For example, the user device 110 may identify the type of the second sensor data based at least in part on a type of the sensor used to obtain the second sensor data. The type of the second sensor data may be light level data, device rotation data, sound level data, or the like. Based at least in part on the type of the second sensor data, the user device 110 may select, for use by the user device 110, a machine learning model from a plurality of machine learning models. For example, the user device 110 may select a first machine learning model (e.g., trained to identify a setting for a brightness of the display of the user device 110) if the second sensor data is a first type of data (e.g., light level data), a second machine learning model (e.g., trained to identify a setting for a rotation orientation of the display) if the second sensor data is a second type of data (e.g., device rotation data), and so forth.

As shown by reference number 340, the user device 110 may determine a second setting for the feature using the machine learning model. For example, the user device 110, using the machine learning model, may determine the second setting based at least in part on the second sensor data. That is, the user device 110 may provide the second sensor data as an input to the machine learning model, and the user device 110 may obtain the second setting as an output of the machine learning model, as described above. The machine learning model may determine the second setting for the feature based at least in part on information relating to the user-controlled change to the first setting (as well as one or more additional user-controlled changes to a setting), as described above. The user device 110 may determine the second setting for the feature responsive to the second sensor data indicating the change to the characteristic (e.g., if the characteristic changed by a threshold amount).

The machine learning model may determine the second setting for the feature based at least in part on the second sensor data (e.g., based at least in part on an amount of a change in the second sensor data or a value associated with the change). Additionally, the machine learning model may determine the second setting for the feature further based at least in part on a time at which the second sensor data was collected (e.g., a timestamp), and/or a location (e.g., geographic coordinates) of the user device 110 at the time at which the second sensor data was collected. For example, based at least in part on the second sensor data, the machine learning model may determine one second setting for the feature if the time is a first time and/or the location is a first location, and the machine learning model may determine another second setting for the feature if the time is a second time and/or the location is a second location.

As shown by reference number 345, the user device 110 may cause automatic implementation of the second setting for the feature. That is, the user device 110 may cause adjustment of a setting for the feature to the second setting identified by the machine learning model based at least in part on the second sensor data. The user device 110 may cause automatic implementation of the second setting for the feature responsive to the second sensor data indicating the change to the characteristic (e.g., if the characteristic changed by a threshold amount).

In this way, the user device 110 may identify, and automatically implement, a setting for the feature that has improved accuracy, thereby conserving computing resources that would otherwise be expended when an erroneous setting is automatically implemented for the feature.

As indicated above, FIGS. 3A-3D are provided as an example. Other examples may differ from what is described with respect to FIGS. 3A-3D.

Figure 4:
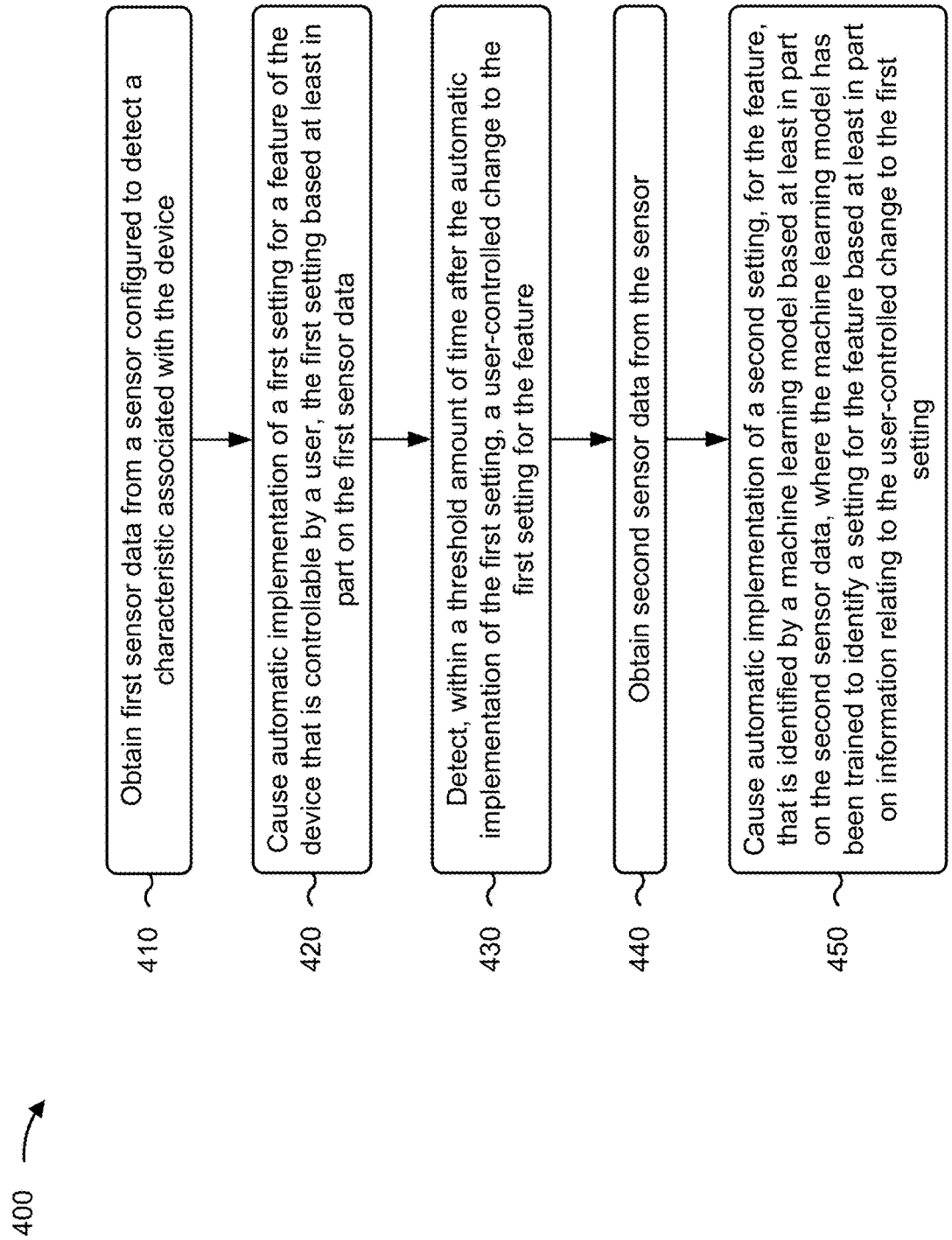
FIG. 4 is a flowchart of an example process associated with automatic implementation of a setting for a feature of a user device using machine learning.

FIG. 4 is a flowchart of an example process 400 associated with automatic implementation of a setting for a feature of a user device using machine learning. In some aspects, one or more process blocks of FIG. 4 are performed by a device (e.g., user device 110). In some aspects, one or more process blocks of FIG. 4 are performed by another device or a group of devices separate from or including the device, such as a server device (e.g., server device 120). Additionally, or alternatively, one or more process blocks of FIG. 4 may be performed by one or more components of device 200, such as processor 210, memory 215, storage component 220, input component 225, output component 230, communication interface 235, and/or sensor 240.

As shown in FIG. 4, process 400 may include obtaining first sensor data from a sensor configured to detect a characteristic associated with the device (block 410). For example, the device may obtain first sensor data from a sensor configured to detect a characteristic associated with the device, as described above.

As further shown in FIG. 4, process 400 may include causing automatic implementation of a first setting for a feature of the device that is controllable by a user, the first setting based at least in part on the first sensor data (block 420). For example, the device may cause automatic implementation of a first setting for a feature of the device that is controllable by a user, the first setting based at least in part on the first sensor data, as described above.

As further shown in FIG. 4, process 400 may include detecting, within a threshold amount of time after the automatic implementation of the first setting, a user-controlled change to the first setting for the feature (block 430). For example, the device may detect, within a threshold amount of time after the automatic implementation of the first setting, a user-controlled change to the first setting for the feature, as described above.

As further shown in FIG. 4, process 400 may include obtaining second sensor data from the sensor (block 440). For example, the device may obtain second sensor data from the sensor, as described above.

As further shown in FIG. 4, process 400 may include causing automatic implementation of a second setting, for the feature, that is identified by a machine learning model based at least in part on the second sensor data, where the machine learning model has been trained to identify a setting for the feature based at least in part on information relating to the user-controlled change to the first setting (block 450). For example, the device may cause automatic implementation of a second setting, for the feature, that is identified by a machine learning model based at least in part on the second sensor data, as described above. In some aspects, the machine learning model has been trained to identify a setting for the feature based at least in part on information relating to the user-controlled change to the first setting.

Process 400 may include additional aspects, such as any single aspect or any combination of aspects described below and/or in connection with one or more other processes described elsewhere herein.

In a first aspect, the feature is a brightness of a display of the device, a rotation orientation of the display, a volume of a speaker of the device, or a mode for a camera of the device.

In a second aspect, alone or in combination with the first aspect, the information relating to the user-controlled change to the first setting indicates one or more of a value of the user-controlled change to the first setting, the first sensor data, a time at which the first sensor data was collected, or a location of the device at the time at which the first sensor data was collected.

In a third aspect, alone or in combination with one or more of the first and second aspects, the machine learning model has been trained to identify the second setting for the feature based at least in part on one or more of the second sensor data, a time at which the second sensor data was collected, or a location of the device at the time at which the second sensor data was collected.

In a fourth aspect, alone or in combination with one or more of the first through third aspects, the machine learning model is a regression model or a classifier model.

In a fifth aspect, alone or in combination with one or more of the first through fourth aspects, process 400 includes determining the first setting based at least in part on the first sensor data, and determining the second setting based at least in part on the second sensor data using the machine learning model.

In a sixth aspect, alone or in combination with one or more of the first through fifth aspects, the first setting is determined using the machine learning model.

In a seventh aspect, alone or in combination with one or more of the first through sixth aspects, process 400 includes identifying a type of the second sensor data, and selecting, for use by the device, the machine learning model, from a plurality of machine learning models, based at least in part on the type of the second sensor data.

Although FIG. 4 shows example blocks of process 400, in some aspects, process 400 includes additional blocks, fewer blocks, different blocks, or differently arranged blocks than those depicted in FIG. 4. Additionally, or alternatively, two or more of the blocks of process 400 may be performed in parallel.

FIG. 5 is a flowchart of an example process 500 associated with automatic implementation of a setting for a feature of a user device using machine learning. In some aspects, one or more process blocks of FIG. 5 are performed by a device (e.g., user device 110). In some aspects, one or more process blocks of FIG. 5 are performed by another device or a group of devices separate from or including the device, such as a server device (e.g., server device 120). Additionally, or alternatively, one or more process blocks of FIG. 5 may be performed by one or more components of device 200, such as processor 210, memory 215, storage component 220, input component 225, output component 230, communication interface 235, and/or sensor 240.

As shown in FIG. 5, process 500 may include obtaining first sensor data from a sensor configured to detect a characteristic associated with the device (block 510). For example, the device may obtain first sensor data from a sensor configured to detect a characteristic associated with the device, as described above.

As further shown in FIG. 5, process 500 may include causing automatic implementation of a first setting for a feature of the device that is controllable by a user, the first setting based at least in part on the first sensor data (block 520). For example, the device may cause automatic implementation of a first setting for a feature of the device that is controllable by a user, the first setting based at least in part on the first sensor data, as described above.

As further shown in FIG. 5, process 500 may include detecting, within a threshold amount of time after the automatic implementation of the first setting, a user-controlled change to the first setting for the feature (block 530). For example, the device may detect, within a threshold amount of time after the automatic implementation of the first setting, a user-controlled change to the first setting for the feature, as described above.

As further shown in FIG. 5, process 500 may include obtaining second sensor data from the sensor (block 540). For example, the device may obtain second sensor data from the sensor, as described above.

As further shown in FIG. 5, process 500 may include causing automatic implementation of a second setting, for the feature, that is identified by a machine learning model based at least in part on the second sensor data, where the machine learning model has been trained to identify a setting for the feature based at least in part on the information relating to the user-controlled change to the first setting (block 550). For example, the device may cause automatic implementation of a second setting, for the feature, that is identified by a machine learning model based at least in part on the second sensor data, as described above. In some aspects, the machine learning model has been trained to identify a setting for the feature based at least in part on the information relating to the user-controlled change to the first setting Process 500 may include additional aspects, such as any single aspect or any combination of aspects described below and/or in connection with one or more other processes described elsewhere herein.

In a first aspect, the feature is a brightness of a display of the device, a rotation orientation of the display, a volume of a speaker of the device, or a mode for a camera of the device.

In a second aspect, alone or in combination with the first aspect, the information relating to the user-controlled change to the first setting indicates one or more of a value of the user-controlled change to the first setting, the first sensor data, a time at which the first sensor data was collected, or a location of the device at the time at which the first sensor data was collected.

In a third aspect, alone or in combination with one or more of the first and second aspects, the machine learning model identifies the second setting for the feature based at least in part on one or more of the second sensor data, a time at which the second sensor data was collected, or a location of the device at the time at which the second sensor data was collected.

In a fourth aspect, alone or in combination with one or more of the first through third aspects, the machine learning model has been trained to identify the setting for the feature based at least in part on information relating to a plurality of user-controlled changes for the feature.

In a fifth aspect, alone or in combination with one or more of the first through fourth aspects, process 500 includes causing automatic implementation of the second setting responsive to the second sensor data indicating that the characteristic associated with the device has changed by a threshold amount.

Although FIG. 5 shows example blocks of process 500, in some aspects, process 500 includes additional blocks, fewer blocks, different blocks, or differently arranged blocks than those depicted in FIG. 5. Additionally, or alternatively, two or more of the blocks of process 500 may be performed in parallel.

FIG. 6 is a flowchart of an example process 600 associated with automatic implementation of a setting for a feature of a user device using machine learning. In some aspects, one or more process blocks of FIG. 6 are performed by a device (e.g., user device 110). In some aspects, one or more process blocks of FIG. 6 are performed by another device or a group of devices separate from or including the device, such as a server device (e.g., server device 120). Additionally, or alternatively, one or more process blocks of FIG. 6 may be performed by one or more components of device 200, such as processor 210, memory 215, storage component 220, input component 225, output component 230, communication interface 235, and/or sensor 240.

As shown in FIG. 6, process 600 may include obtaining sensor data from a sensor configured to detect a characteristic associated with the device (block 610). For example, the device may obtain sensor data from a sensor configured to detect a characteristic associated with the device, as described above.

As further shown in FIG. 6, process 600 may include determining, based at least in part on the sensor data and using a machine learning model, a setting for a feature of the device, where the machine learning model is trained to identify the setting based at least in part on information relating to a plurality of user-controlled changes to previous settings automatically implemented for the feature (block 620). For example, the device may determine, based at least in part on the sensor data and using a machine learning model, a setting for a feature of the device. In some aspects, the machine learning model has been trained to identify the setting based at least in part on information relating to a plurality of user-controlled changes to previous settings automatically implemented for the feature.

As further shown in FIG. 6, process 600 may include causing automatic implementation of the setting for the features (block 630). For example, the device may cause automatic implementation of the setting for the features, as described above.

Process 600 may include additional aspects, such as any single aspect or any combination of aspects described below and/or in connection with one or more other processes described elsewhere herein.

In a first aspect, the feature is a brightness of a display of the device, a rotation orientation of the display, a volume of a speaker of the device, or a mode for a camera of the device.

In a second aspect, alone or in combination with the first aspect, the machine learning model identifies the setting for the feature based at least in part on one or more of the sensor data, a time at which the sensor data was collected, or a location of the device at the time at which the sensor data was collected.

In a third aspect, alone or in combination with one or more of the first and second aspects, the sensor is a photodetector, a gyroscope, a microphone, or a camera.

In a fourth aspect, alone or in combination with one or more of the first through third aspects, process 600 includes identifying a type of the sensor data, and selecting, for use by the device, the machine learning model, from a plurality of machine learning models, based at least in part on the type of the sensor data.

In a fifth aspect, alone or in combination with one or more of the first through fourth aspects, the characteristic associated with the device relates to a physical environment of the device or a condition of the device.

Although FIG. 6 shows example blocks of process 600, in some aspects, process 600 includes additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method, comprising: obtaining, by a device, first sensor data from a sensor configured to detect a characteristic associated with the device; causing, by the device, automatic implementation of a first setting for a feature of the device that is controllable by a user, the first setting based at least in part on the first sensor data; detecting, by the device and within a threshold amount of time after the automatic implementation of the first setting, a user-controlled change to the first setting for the feature; obtaining, by the device, second sensor data from the sensor; and causing, by the device, automatic implementation of a second setting, for the feature, that is identified by a machine learning model based at least in part on the second sensor data, wherein the machine learning model has been trained to identify a setting for the feature based at least in part on information relating to the user-controlled change to the first setting.

Aspect 2: The method of Aspect 1, wherein the feature is a brightness of a display of the device, a rotation orientation of the display, a volume of a speaker of the device, or a mode for a camera of the device.

Aspect 3: The method of any of Aspects 1-2, wherein the information relating to the user-controlled change to the first setting indicates one or more of: a value of the user-controlled change to the first setting, the first sensor data, a time at which the first sensor data was collected, or a location of the device at the time at which the first sensor data was collected.

Aspect 4: The method of any of Aspects 1-3, wherein the machine learning model has been trained to identify the second setting for the feature based at least in part on one or more of: the second sensor data, a time at which the second sensor data was collected, or a location of the device at the time at which the second sensor data was collected.

Aspect 5: The method of any of Aspects 1-4, wherein the machine learning model is a regression model or a classifier model.

Aspect 6: The method of any of Aspects 1-5, further comprising: determining the first setting based at least in part on the first sensor data; and determining the second setting based at least in part on the second sensor data using the machine learning model.

Aspect 7: The method of Aspect 6, wherein the first setting is determined using the machine learning model.

Aspect 8: The method of any of Aspects 1-7, further comprising: identifying a type of the second sensor data; and selecting, for use by the device, the machine learning model, from a plurality of machine learning models, based at least in part on the type of the second sensor data.

Aspect 9: A device, comprising: a memory; and one or more processors, coupled to the memory, configured to: obtain first sensor data from a sensor configured to detect a characteristic associated with the device; cause automatic implementation of a first setting for a feature of the device that is controllable by a user, the first setting based at least in part on the first sensor data; detect, within a threshold amount of time after the automatic implementation of the first setting, a user-controlled change to the first setting for the feature; obtain second sensor data from the sensor; and cause automatic implementation of a second setting, for the feature, that is identified by a machine learning model based at least in part on the second sensor data, wherein the machine learning model has been trained to identify a setting for the feature based at least in part on the information relating to the user-controlled change to the first setting.

Aspect 10: The device of Aspect 9, wherein the feature is a brightness of a display of the device, a rotation orientation of the display, a volume of a speaker of the device, or a mode for a camera of the device.

Aspect 11: The device of any of Aspects 9-10, wherein the information relating to the user-controlled change to the first setting indicates one or more of: a value of the user-controlled change to the first setting, the first sensor data, a time at which the first sensor data was collected, or a location of the device at the time at which the first sensor data was collected.

Aspect 12: The device of any of Aspects 9-11, wherein the machine learning model identifies the second setting for the feature based at least in part on one or more of: the second sensor data, a time at which the second sensor data was collected, or a location of the device at the time at which the second sensor data was collected.

Aspect 13: The device of any of Aspects 9-12, wherein the machine learning model has been trained to identify the setting for the feature based at least in part on information relating to a plurality of user-controlled changes for the feature.

Aspect 14: The device of any of Aspects 9-13, wherein the one or more processors, to cause automatic implementation of the second setting, are configured to: cause automatic implementation of the second setting responsive to the second sensor data indicating that the characteristic associated with the device has changed by a threshold amount.

Aspect 15: A non-transitory computer-readable medium storing a set of instructions, the set of instructions comprising: one or more instructions that, when executed by one or more processors of a device, cause the device to: obtain sensor data from a sensor configured to detect a characteristic associated with the device; determine, based at least in part on the sensor data and using a machine learning model, a setting for a feature of the device, wherein the machine learning model has been trained to identify the setting based at least in part on information relating to a plurality of user-controlled changes to previous settings automatically implemented for the feature; and cause automatic implementation of the setting for the features.

Aspect 16: The non-transitory computer-readable medium of Aspect 15, wherein the feature is a brightness of a display of the device, a rotation orientation of the display, a volume of a speaker of the device, or a mode for a camera of the device.

Aspect 17: The non-transitory computer-readable medium of any of Aspects wherein the machine learning model identifies the setting for the feature based at least in part on one or more of: the sensor data, a time at which the sensor data was collected, or a location of the device at the time at which the sensor data was collected.

Aspect 18: The non-transitory computer-readable medium of any of Aspects wherein the sensor is a photodetector, a gyroscope, a microphone, or a camera.

Aspect 19: The non-transitory computer-readable medium of any of Aspects wherein the one or more instructions, when executed by the one or more processors of the device, further cause the device to: identify a type of the sensor data; and select, for use by the device, the machine learning model, from a plurality of machine learning models, based at least in part on the type of the sensor data.

Aspect 20: The non-transitory computer-readable medium of any of Aspects wherein the characteristic associated with the device relates to a physical environment of the device or a condition of the device.

Aspect 21: An apparatus, comprising a processor; memory coupled with the processor; and instructions stored in the memory and executable by the processor to cause the apparatus to perform the method of one or more of Aspects 1-8.

Aspect 22: A device, comprising a memory and one or more processors coupled to the memory, the one or more processors configured to perform the method of one or more of Aspects 1-8.

Aspect 23: An apparatus, comprising at least one means for performing the method of one or more of Aspects 1-8.

Aspect 24: A non-transitory computer-readable medium storing code, the code comprising instructions executable by a processor to perform the method of one or more of Aspects 1-8.

Aspect 25: A non-transitory computer-readable medium storing a set of instructions, the set of instructions comprising one or more instructions that, when executed by one or more processors of a device, cause the device to perform the method of one or more of Aspects 1-8.

Aspect 26: An apparatus, comprising a processor; memory coupled with the processor; and instructions stored in the memory and executable by the processor to cause the apparatus to perform the steps performed by the one or more processors of one or more of Aspects 9-14.

Aspect 27: A method comprising the steps performed by the one or more processors of one or more of Aspects 9-14.

Aspect 28: An apparatus, comprising at least one means for performing the steps performed by the one or more processors of one or more of Aspects 9-14.

Aspect 29: A non-transitory computer-readable medium storing code, the code comprising instructions executable by a processor to perform the steps performed by the one or more processors of one or more of Aspects 9-14.

Aspect 30: A non-transitory computer-readable medium storing a set of instructions, the set of instructions comprising one or more instructions that, when executed by one or more processors of a device, cause the device to perform the steps performed by the one or more processors of one or more of Aspects 9-14.

Aspect 31: An apparatus, comprising a processor; memory coupled with the processor; and instructions stored in the memory and executable by the processor to cause the apparatus to perform the steps performed by the device of one or more of Aspects 15-20.

Aspect 32: A device, comprising a memory and one or more processors coupled to the memory, the one or more processors configured to perform the steps performed by the device of one or more of Aspects 15-20.

Aspect 33: An apparatus, comprising at least one means for performing the steps performed by the device of one or more of Aspects 15-20.

Aspect 34: A non-transitory computer-readable medium storing code, the code comprising instructions executable by a processor to perform the steps performed by the device of one or more of Aspects 15-20.

Aspect 35: A method comprising the steps performed by the device of one or more of Aspects 15-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
obtaining, by a device, first sensor data from a sensor configured to detect a characteristic associated with the device;
causing, by the device, automatic implementation of a first setting for a feature of the device that is controllable by a user, the first setting based at least in part on the first sensor data;
detecting, by the device and within a threshold amount of time after the automatic implementation of the first setting, a user-controlled change to the first setting for the feature;
obtaining, by the device and in response to detecting the user-controlled change, second sensor data, from the sensor, indicating a change in the characteristic; and
causing, by the device and after obtaining the second sensor data, automatic implementation of a second setting, for the feature, that is identified by a machine learning model based at least in part on the second sensor data and information relating to the user-controlled change to the first setting.

2. The method of claim 1,
wherein the feature is a brightness of a display of the device, a rotation orientation of the display, a volume of a speaker of the device, or a mode for a camera of the device.

3. The method of claim 1,
wherein the information relating to the user-controlled change to the first setting indicates one or more of:
a value of the user-controlled change to the first setting,
the first sensor data,
a time at which the first sensor data was collected, or
a location of the device at the time at which the first sensor data was collected.

4. The method of claim 1,
wherein the machine learning model has been trained to identify the second setting for the feature based at least in part on one or more of:
the second sensor data,
a time at which the second sensor data was collected, or
a location of the device at the time at which the second sensor data was collected.

5. The method of claim 1,
wherein the machine learning model is a regression model or a classifier model.

6. The method of claim 1, further comprising:
determining the first setting based at least in part on the first sensor data; and
determining the second setting based at least in part on the second sensor data using the machine learning model.

7. The method of claim 6,
wherein the first setting is determined using the machine learning model.

8. The method of claim 1, further comprising:
identifying a type of the second sensor data; and
selecting, for use by the device, the machine learning model, from a plurality of machine learning models, based at least in part on the type of the second sensor data.

9. A device, comprising:
a memory; and
one or more processors, coupled to the memory, configured to:
- obtain first sensor data from a sensor configured to detect a characteristic associated with the device;
- cause automatic implementation of a first setting for a feature of the device that is controllable by a user, the first setting based at least in part on the first sensor data;
- detect, within a threshold amount of time after the automatic implementation of the first setting, a user-controlled change to the first setting for the feature;
- obtain, in response to detecting the user-controlled change, second sensor data, from the sensor, indicating a change to the characteristic; and
- cause, after obtaining the second sensor data, automatic implementation of a second setting, for the feature, that is identified by a machine learning model based at least in part on the second sensor data and information relating to the user-controlled change to the first setting.

10. The device of claim 9, wherein the feature is a brightness of a display of the device, a rotation orientation of the display, a volume of a speaker of the device, or a mode for a camera of the device.

11. The device of claim 9, wherein the information relating to the user-controlled change to the first setting indicates one or more of:
- a value of the user-controlled change to the first setting,
- the first sensor data,
- a time at which the first sensor data was collected, or
- a location of the device at the time at which the first sensor data was collected.

12. The device of claim 9, wherein the machine learning model identifies the second setting for the feature based at least in part on one or more of:
- the second sensor data,
- a time at which the second sensor data was collected, or
- a location of the device at the time at which the second sensor data was collected.

13. The device of claim 9, wherein the machine learning model has been trained to identify the second setting for the feature based at least in part on information relating to a plurality of user-controlled changes for the feature.

14. The device of claim 9, wherein the one or more processors, to cause the automatic implementation of the second setting, are configured to:
- cause the automatic implementation of the second setting responsive to the second sensor data indicating that the characteristic associated with the device has changed by a threshold amount.

15. A non-transitory computer-readable medium storing a set of instructions, the set of instructions comprising:
one or more instructions that, when executed by one or more processors of a device, cause the device to:
- cause, based at least in part on a characteristic associated with the device, automatic implementation of a first setting for a feature of the device;
- obtain, after causing the automatic implementation of the first setting for the feature, sensor data, from a sensor configured to detect the characteristic, indicating a change to the characteristic;
- determine, based at least in part on the sensor data and using a machine learning model, a second setting for the feature,
  - wherein the machine learning model has been trained to identify the second setting based at least in part on information relating to a user-controlled change to the first setting; and
- cause automatic implementation of the second setting for the feature.

16. The non-transitory computer-readable medium of claim 15, wherein the feature is a brightness of a display of the device, a rotation orientation of the display, a volume of a speaker of the device, or a mode for a camera of the device.

17. The non-transitory computer-readable medium of claim 15, wherein the machine learning model identifies the second setting for the feature based at least in part on one or more of:
- the sensor data,
- a time at which the sensor data was collected, or
- a location of the device at the time at which the sensor data was collected.

18. The non-transitory computer-readable medium of claim 15, wherein the sensor is a photodetector, a gyroscope, a microphone, or a camera.

19. The non-transitory computer-readable medium of claim 15, wherein the one or more instructions, when executed by the one or more processors of the device, further cause the device to:
- identify a type of the sensor data; and
- select, for use by the device, the machine learning model, from a plurality of machine learning models, based at least in part on the type of the sensor data.

20. The non-transitory computer-readable medium of claim 15, wherein the characteristic associated with the device relates to a physical environment of the device or a condition of the device.

\* \* \* \* \*